United States Patent
Tago

(10) Patent No.: US 8,041,721 B2
(45) Date of Patent: Oct. 18, 2011

(54) ATTRIBUTE EXTRACTION PROCESSING METHOD AND APPARATUS

(75) Inventor: Shinichiro Tago, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 12/343,494

(22) Filed: Dec. 24, 2008

(65) Prior Publication Data

US 2009/0216751 A1   Aug. 27, 2009

(30) Foreign Application Priority Data

Dec. 26, 2007   (JP) .................... 2007-333704

(51) Int. Cl.
*G06F 7/00* (2006.01)
*G06F 17/30* (2006.01)

(52) U.S. Cl. ........................ 707/749; 707/758

(58) Field of Classification Search .............. 707/749, 707/758, 999.03
See application file for complete search history.

(56) References Cited

U.S. PATENT DOCUMENTS 7,493,364 B2 * 2/2009 Kawamura et al. ........... 709/204
7,818,332 B2 * 10/2010 Olds et al. .................. 707/759
2003/0018629 A1 * 1/2003 Namba ......................... 707/3

FOREIGN PATENT DOCUMENTS

| JP | 2001-282837 A | 10/2001 |
| JP | 2004-280569 A | 10/2004 |
| JP | 2006-113984 | 4/2010 |

* cited by examiner

*Primary Examiner* — Cam Truong
(74) *Attorney, Agent, or Firm* — Fujitsu Patent Center

(57) ABSTRACT

A machine-executable attribute extraction method comprising: extracting, vis-à-vis a plurality of documents in the archival memory (that also stores registration dates and attributes of the documents) having registration dates falling within a desired time period, feature words for each attribute value of the corresponding attributes of the plurality of documents; registering, into the work memory, the desired time period, and the extracted feature words for each attribute value of the corresponding attributes of the plurality of documents; determining, amongst the extracted feature words in the work memory, first feature words for which the attribute has a first attribute value and second feature words for which the attribute has a second attribute value; calculating a similarity between the first feature words and the second feature words; judging whether the similarity satisfies a condition; and outputting the second attribute value when the similarity satisfies the condition.

7 Claims, 35 Drawing Sheets

FIG. 4

| URL | TIME PERIOD | PROPER NOUNS |
|---|---|---|
| http://xxx, | Aug2007, | CELEBRITY H, CELEBRITY I, COMPANY NAME J, PLACE NAME K, EVENT NAME L, PRODUCT NAME M |
| http://xxx, | Sep2007, | CELEBRITY A, CELEBRITY B, PRODUCT NAME C, COMPANY NAME D, EVENT NAME E |
| http://xxx, | Oct2007, | CELEBRITY B, COMPANY NAME D, EVENT NAME E, CELEBRITY F, PRODUCT NAME G |
| http://xxx, | Nov2007, | CELEBRITY A, CELEBRITY B, PRODUCT NAME C, EVENT NAME E, CELEBRITY F |
| http://yyy, | Aug2007, | CELEBRITY B |
| http://yyy, | Sep2007, | CELEBRITY B, PRODUCT NAME C, COMPANY NAME D, CELEBRITY X |
| http://yyy, | Oct2007, | CELEBRITY B, CELEBRITY V |
| http://yyy, | Nov2007, | CELEBRITY B, CELEBRITY X |
| http://zzz, | Aug2007, | CELEBRITY X, CELEBRITY Z |
| http://zzz, | Sep2007, | CELEBRITY Y, CELEBRITY Z |
| http://zzz, | Oct2007, | CELEBRITY XX, CELEBRITY YY |
| http://zzz, | Nov2007, | CELEBRITY YY, CELEBRITY ZZ |
| http://xyz, | Aug2007, | CELEBRITY I, COMPANY NAME J, PLACE NAME K, PRODUCT NAME M, CELEBRITY N |
| http://xyz, | Sep2007, | CELEBRITY A, CELEBRITY B, COMPANY NAME D, PRODUCT NAME G |
| http://xyz, | Oct2007, | CELEBRITY B, PRODUCT NAME C, EVENT NAME E, CELEBRITY F |
| http://xyz, | Nov2007, | CELEBRITY A, PRODUCT NAME C, COMPANY NAME D, PRODUCT NAME G |

FIG. 7 http://xxx

FIG. 8

| URL | TIME PERIOD | PROPER NOUNS |
|---|---|---|
| http://xxx | Aug2007 | CELEBRITY H, CELEBRITY I, COMPANY NAME J, PLACE NAME K, EVENT NAME L, PRODUCT NAME M |
| http://xxx | Sep2007 | CELEBRITY A, CELEBRITY B, PRODUCT NAME C, COMPANY NAME D, EVENT NAME E |
| http://xxx | Oct2007 | CELEBRITY B, COMPANY NAME D, EVENT NAME E, CELEBRITY F, PRODUCT NAME G |
| http://xxx | Nov2007 | CELEBRITY A, CELEBRITY B, PRODUCT NAME C, EVENT NAME E, CELEBRITY F |

FIG. 9

SIMILARITY THRESHOLD VALUE: 3, NUMBER-OF-TIME-PERIODS THRESHOLD VALUE: null

FIG. 10

CELEBRITY A, CELEBRITY B, PRODUCT NAME C, COMPANY NAME D, EVENT NAME E, Sep2007, Oct2007, Nov2007

FIG. 12

PROPER NOUN; EVALUATION TARGET TIME PERIOD
CELEBRITY A, CELEBRITY B, PRODUCT NAME C, COMPANY NAME D, EVENT NAME E, Sep2007, Nov2007

FIG. 14

SIMILARITY THRESHOLD VALUE: 3, NUMBER-OF-TIME-PERIODS THRESHOLD VALUE: 2

FIG. 15

```
URL, TIME PERIOD, PROPER NOUNS
http://xxx, Sep2007, CELEBRITY A
http://xxx, Sep2007, CELEBRITY B
http://xxx, Sep2007, PRODUCT NAME C
http://xxx, Sep2007, COMPANY NAME D
http://xxx, Sep2007, EVENT NAME E
http://yyy, Sep2007, CELEBRITY B
http://yyy, Sep2007, PRODUCT NAME C
http://yyy, Sep2007, COMPANY NAME D
http://xyz, Sep2007, CELEBRITY A
http://xyz, Sep2007, CELEBRITY B
http://xyz, Sep2007, COMPANY NAME D
http://xxx, Nov2007, CELEBRITY A
http://xxx, Nov2007, CELEBRITY B
http://xxx, Nov2007, PRODUCT NAME C
http://xxx, Nov2007, EVENT NAME E
http://yyy, Nov2007, CELEBRITY B
http://xyz, Nov2007, CELEBRITY A
http://xyz, Nov2007, PRODUCT NAME C
http://xyz, Nov2007, COMPANY NAME D
```

FIG. 16

URL, TIME PERIOD, NUMBER OF COUNTS
http://xxx,Sep2007,5
http://yyy,Sep2007,3
http://xyz,Sep2007,3
http://xxx,Nov2007,4
http://yyy,Nov2007,1
http://xyz,Nov2007,3

FIG. 17

| URL, TIME PERIOD |
|---|
| http://xxx,Sep2007 |
| http://yyy,Sep2007 |
| http://xyz,Sep2007 |
| http://xxx,Nov2007 |
| http://xyz,Nov2007 |

FIG. 18

| URL, SCORE |
|---|
| http://xxx,2 |
| http://yyy,1 |
| http://xyz,2 |

FIG. 19

```
http://xxx
http://xyz
```

FIG. 21

| URL, TIME PERIOD, PROPER NOUNS |
|---|
| http://xxx, Aug2007, CELEBRITY H, CELEBRITY I, COMPANY NAME J, PLACE NAME K, EVENT NAME L, PRODUCT NAME M |
| http://xxx, Sep2007, CELEBRITY A, CELEBRITY B, PRODUCT NAME C, COMPANY NAME D, EVENT NAME E |
| http://xxx, Oct2007, CELEBRITY B, COMPANY NAME D, EVENT NAME E, CELEBRITY F, PRODUCT NAME G |
| http://xxx, Nov2007, CELEBRITY A, CELEBRITY B, PRODUCT NAME C, EVENT NAME E, CELEBRITY F |

FIG. 22A http://xxx, Aug2007, CELEBRITY H, CELEBRITY I, COMPANY NAME J, REGION NAME K, EVENT NAME L, PRODUCT NAME M

FIG. 22B http://xxx, Sep2007, CELEBRITY A, CELEBRITY B, PRODUCT NAME C, COMPANY NAME D, EVENT NAME E

FIG. 23

SIMILARITY THRESHOLD VALUE: 3, NUMBER-OF-TIME-PERIODS THRESHOLD VALUE: null

FIG. 24

Aug2007, Aug2007, CELEBRITY H, CELEBRITY I, COMPANY NAME J, PLACE NAME K, EVENT NAME L, PRODUCT NAME M

FIG. 25

START TIME PERIOD, END TIME PERIOD, PROPER NOUNS
Aug2007, Aug2007, CELEBRITY H, CELEBRITY I, COMPANY NAME J, PLACE NAME K, EVENT NAME L, PRODUCT NAME M
Sep2007, Nov2007, CELEBRITY A, CELEBRITY B, PRODUCT NAME C, COMPANY NAME D, EVENT NAME E, CELEBRITY F, PRODUCT NAME G

FIG. 27

| EVALUATION TARGET TIME PERIOD: PROPER NOUNS |
|---|
| Aug2007: CELEBRITY H, CELEBRITY I, COMPANY NAME J, PLACE NAME K, EVENT NAME L, PRODUCT NAME M |
| Nov2007: CELEBRITY A, CELEBRITY B, PRODUCT NAME C, COMPANY NAME D, EVENT NAME E, CELEBRITY F, PRODUCT NAME G |
| Sep2007: CELEBRITY A, CELEBRITY B, PRODUCT NAME C, COMPANY NAME D, EVENT NAME E, CELEBRITY F, PRODUCT NAME G |

FIG. 28

SIMILARITY THRESHOLD VALUE: 3, NUMBER-OF-TIME-PERIODS THRESHOLD VALUE: 3

FIG. 29

```
URL, TIME PERIOD, PROPER NOUNS
http://xxx, Aug2007, CELEBRITY H
http://xxx, Aug2007, CELEBRITY I
http://xxx, Aug2007, COMPANY NAME J
http://xxx, Aug2007, PLACE NAME K
http://xxx, Aug2007, EVENT NAME L
http://xxx, Aug2007, PRODUCT NAME M
http://xyz, Aug2007, CELEBRITY I
http://xyz, Aug2007, COMPANY NAME J
http://xyz, Aug2007, PLACE NAME K
http://xyz, Aug2007, PRODUCT NAME M
http://xxx, Sep2007, CELEBRITY A
http://xxx, Sep2007, CELEBRITY B
http://xxx, Sep2007, PRODUCT NAME C
http://xxx, Sep2007, COMPANY NAME D
http://xxx, Sep2007, EVENT NAME E
http://yyy, Sep2007, CELEBRITY B
http://yyy, Sep2007, PRODUCT NAME C
http://yyy, Sep2007, COMPANY NAME D
http://xyz, Sep2007, CELEBRITY A
http://xyz, Sep2007, CELEBRITY B
http://xyz, Sep2007, COMPANY NAME D
http://xxx, Nov2007, CELEBRITY A
http://xxx, Nov2007, CELEBRITY B
http://xxx, Nov2007, PRODUCT NAME C
http://xxx, Nov2007, EVENT NAME E
http://xxx, Nov2007, CELEBRITY F
http://yyy, Nov2007, CELEBRITY B
http://xyz, Nov2007, CELEBRITY A
http://xyz, Nov2007, PRODUCT NAME C
http://xyz, Nov2007, COMPANY NAME D
```

FIG. 30

| URL, TIME PERIOD, SIMILARITY |
|---|
| http://xxx,Aug2007,6 |
| http://xyz,Aug2007,4 |
| http://xxx,Sep2007,5 |
| http://yyy,Sep2007,3 |
| http://xyz,Sep2007,3 |
| http://xxx,Nov2007,5 |
| http://yyy,Nov2007,1 |
| http://xyz,Nov2007,3 |

FIG. 31

| URL, TIME PERIOD |
|---|
| http://xxx,Aug2007 |
| http://xyz,Aug2007 |
| http://xxx,Sep2007 |
| http://yyy,Sep2007 |
| http://xyz,Sep2007 |
| http://xxx,Nov2007 |
| http://xyz,Nov2007 |

FIG. 32

| URL, SCORE |
|---|
| http://xxx,3 |
| http://yyy,1 |
| http://xyx,3 |

FIG. 33

```
http://xxx
http://xyz
```

ATTRIBUTE EXTRACTION PROCESSING METHOD AND APPARATUS

CROSS-REFERENCE TO RELATED APPLICATIONS

This application claims the benefit of priority from Japanese Patent Application No. 2007-333704 filed on Dec. 26, 2007, which is herein incorporated by reference in its entirety.

BACKGROUND

1. Field

Embodiments of the present invention relate to a document extraction technique and, in particular, to a spam blog extraction technique.

2. Description of Related Art

Utilization of blogs is rapidly spreading in recent years. Thus, some persons perform activities of introducing products or the like in their blogs and participating in affiliate programs of the distributors of the products or the like so as to gain an income. Accordingly, a large number of spam blogs appear in order to acquire as many accesses as possible and promote the sales of the products or the like. Some spam blogs are generated by completely copying or partly modifying other blog articles. Alternatively, as shown in Related Art FIG. 1, spam blog articles are generated by an automatic generation tool on the basis of a proper noun list which is a list of proper nouns that attract attention and a phrase list. Since these blog articles aim at merely acquiring accesses, they are, in many cases, articles in which proper nouns that attract attention are merely scattered and the meaning of which is unrecognizable grammatically.

On the other hand, from another point of view, for the purpose of marketing, a technique of analyzing the contents of blog articles and thereby extracting a consumer trend and the like has been developed.

An approach to automatic extraction of spam blogs is, for example, to determine a similarity on the basis of the degree that proper nouns, which have been extracted from a plurality of articles in a blog A that has been confirmed as a spam blog and which are have been adopted as a reference, are contained in a plurality of articles in a blog B serving as a judgment target. The reason why a plurality of articles need be processed is that if a single article alone were processed, a similarity could not appropriately be calculated because of variation in the proper nouns.

Here, as a technique relevant to this technique, Japanese Laid-Open Patent Publication No. 2001-282837 discloses a technique for efficiently and accurately collecting sites alone that have strong relevance to a particular field. Specifically, a document network is a network of document groups in which documents in various fields are arranged in a distributed manner. A key word data storage section stores keywords contained in the documents in a particular site. A keyword analysis device analyzes the degree that the documents in an arbitrary site of the document network contain the keywords stored in the key word data storage section. Then, on the basis of the analysis result of the keyword analysis device, a field judging unit judges whether the arbitrary site is a site in a particular field.

Similarly, as a relevant technique, Japanese Laid-Open Patent Publication No. 2004-280569 discloses a technique for efficiently extracting sites that have a large amount of information agreeing with a purpose of investigation. Specifically, this system comprises: a crawler section for patrolling and collecting Web documents among the documents on the Internet and outputting the documents and the document URLs having been collected; a first degree-of-rumor calculation section for extracting rumor expressions set up in advance from each document collected by the above-mentioned crawler section, then calculating the degree of rumor of each document on the basis of evaluation values corresponding to the extracted rumor expressions, and then outputting the result; a first site extraction section for extracting a site URL to which each document belongs, from the document URL outputted from the above-mentioned crawler section; a first site feature calculation section for outputting a site feature indicating the contents feature of the site specified by the above-mentioned site URL, and thereby storing the site URL and the site feature in a correspondence manner to each other into a site management table; a site selection section for extracting from the above-mentioned site management table a site feature B of a site URL specified by a system user; a document search section for searching a document on the Internet on the basis of an inputted search condition, and then outputting document information that contains a document URL and an update date as a search result; a new URL extraction section for referring to a URL management table that stores document information for each document URL, then outputting as a new URL a document URL which is not registered in the above-mentioned URL management table and a document URL whose document information is updated among the document URLs outputted from the above-mentioned document search section, and thereby registering the document information of the new URL into the above-mentioned URL management table; a download section for acquiring the document of the above-mentioned new URL from the Internet; a second degree-of-rumor calculation section for extracting rumor expressions set up in advance from each document acquired by the above-mentioned download section, then calculating the degree of rumor of each document on the basis of evaluation values corresponding to the extracted rumor expressions, and then outputting the result; a second site extraction section for extracting from the above-mentioned new URL a new site URL to which each document belongs; a second site feature calculation section for outputting a site feature A indicating the contents feature of the site specified by the above-mentioned new site URL; and a similarity site extraction section for calculating a similarity between the above-mentioned site feature A and the above-mentioned site feature B, then outputting a new site URL having a similarity greater than or equal to a reference value, and then recording the document information of the new site URL into the site management table.

Further, in spam blogs, articles are automatically generated using presently popular keywords. For that matter, ordinary blogs are also frequently generated using presently popular keywords.

SUMMARY

At least one embodiment of the present invention provides a machine-executable attribute extraction method comprising: extracting, vis-à-vis a plurality of documents in the archival memory (that also stores registration dates and attributes of the documents) having registration dates falling within a desired time period, feature words for each attribute value of the corresponding attributes of the plurality of documents; registering, into the work memory, the desired time period, and the extracted feature words for each attribute value of the corresponding attributes of the plurality of documents; determining, amongst the extracted feature words in the work memory, first feature words for which the attribute has a first attribute value and second feature words for which the attribute has a second attribute value; calculating a similarity between the first feature words and the second feature words; judging whether the similarity satisfies a condition; and outputting the second attribute value when the similarity satisfies the condition.

It is to be understood that both the foregoing summary description and the following detailed description are explanatory as to some embodiments of the present invention, and not restrictive of the present invention as claimed.

BRIEF DESCRIPTION OF THE DRAWINGS

Embodiments are illustrated by way of example and not limited by the following figures.

FIG. 4 depicts an arrangement of data stored in a work DB according to an example of an embodiment of the present invention.

FIG. 7 depicts a spam blog URL according to an example of an embodiment of the present invention.

FIG. 8 depicts an input URL extraction list according to an example of an embodiment of the present invention.

FIG. 9 depicts an arrangement of data stored in a threshold data storage section according to an example of an embodiment of the present invention.

FIG. 10 depicts an arrangement of data stored in a proper noun list according to an example of an embodiment of the present invention.

FIG. 12 depicts an arrangement of data stored in a comparison setting list according to an example of an embodiment of the present invention.

FIG. 14 is depicts an arrangement of data stored in a threshold data storage section according to an example of an embodiment of the present invention.

FIG. 15 is depicts an arrangement of data stored in an extraction list according to an example of an embodiment of the present invention.

FIG. 16 depicts an arrangement of data stored in a similarity list according to an example of an embodiment of the present invention.

FIG. 17 depicts an arrangement of data stored in a similarity URL list according to an example of an embodiment of the present invention.

FIG. 18 depicts an arrangement of data stored in a score list according to an example of an embodiment of the present invention.

FIG. 19 depicts an arrangement of data stored in a recognized spam URL list according to an example of an embodiment of the present invention.

FIG. 21 depicts an arrangement of data stored in an input URL extraction list according to an example of an embodiment of the present invention.

FIGS. 22A and 22B depict arrangements of base data according to an example of an embodiment of the present invention.

FIG. 23 depicts an arrangement of data stored in a threshold data storage section according to an example of an embodiment of the present invention.

FIG. 24 depicts an arrangement of data stored in a proper noun list according to an example of an embodiment of the present invention.

FIG. 25 depicts an arrangement of data stored in a proper noun list according to an example of an embodiment of the present invention.

FIG. 27 depicts an arrangement of data stored in a comparison setting list according to an example of an embodiment of the present invention.

FIG. 28 depicts an arrangement of data stored in a threshold data storage section according to an example of an embodiment of the present invention.

FIG. 29 depicts an arrangement of data stored in an extraction list according to an example of an embodiment of the present invention.

FIG. 30 depicts an arrangement of data stored in a similarity list according to an example of an embodiment of the present invention.

FIG. 31 depicts an arrangement of data stored in a similarity URL list according to an example of an embodiment of the present invention.

FIG. 32 depicts an arrangement of data stored in a score list according to an example of an embodiment of the present invention.

FIG. 33 is depicts an arrangement of data stored in a recognized spam URL list according to an example of an embodiment of the present invention.

DETAILED DESCRIPTION OF EXAMPLES OF EMBODIMENTS

Figure 1:
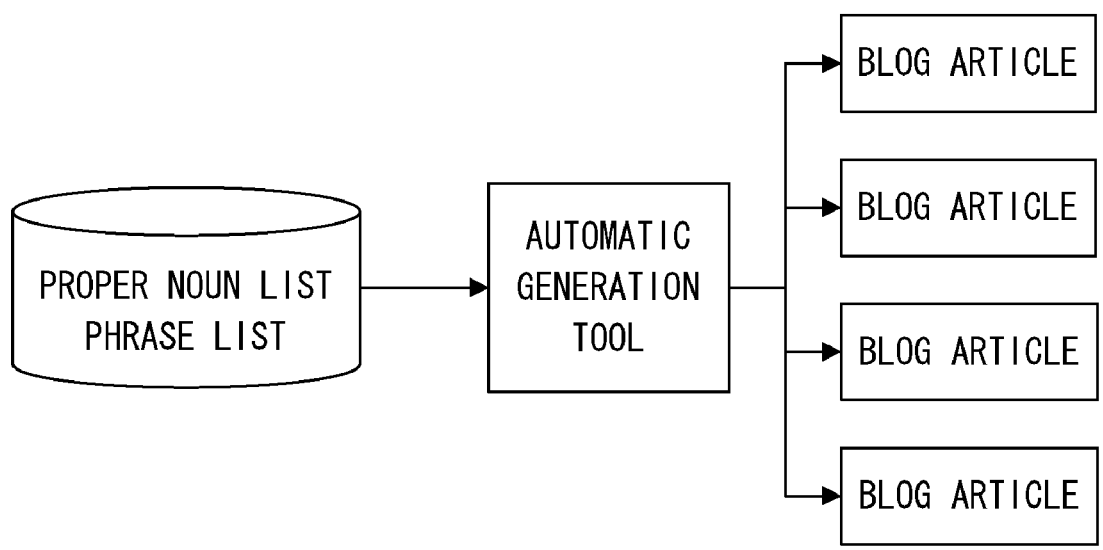
FIG. 1 depicts generation of spam blogs according to an example of an embodiment of the present invention.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present. Like reference numerals refer to like elements throughout.

While inventing the present invention, observations were made regarding the Related Art. Such observations include the following. When collected blog articles are ordinary ones, the Related Art marketing technique, namely analyzing the contents of blog articles and thereby extracting a consumer trend, is useful because appropriate data can be extracted.

Nevertheless, when spam blogs are mixed in, deviated data could be extracted. Thus, it would be desirable to have a mechanism that filters/excludes spam blogs.

In the technique of present day, blog articles generated by simple copying or modification in part can be extracted, for example, using a technique of bigrams. Nevertheless, spam blogs generated by an automatic generation tool on the basis of a proper noun list and a phrase list as described above cannot (without suffering through significant difficulty, if at all) be extracted by a technique of simple bigrams. Thus, extraction of such spam blogs requires human checking and judging of the contents.

Nevertheless, even when the Related Art described above is applied directly, spam blogs cannot (without suffering through significant difficulty, if at all) be extracted. In spam blogs, presently popular keywords (e.g., proper nouns) are used with being changed regularly. Thus, even in case that a similarity is calculated by processing a plurality of articles in a blog, an accurate similarity cannot be obtained (without suffering through significant difficulty, if at all) if comparison is performed without appropriately treating the change time of the keywords. Then, in the above-mentioned Related Art, such time-dependent keyword change is not taken into consideration.

Thus, when the recognition of time periods is merely introduced, the problem cannot be avoided (without suffering through significant difficulty, if at all) that an ordinary blog is erroneously identified as a spam blog.

Thus, an at least one embodiment of the present invention provides a new technique for detecting spam blogs accurately.

At least one embodiment of the present invention provides a new technique for avoiding erroneous detection of spam blogs and thereby detecting spam blogs accurately.

At least one embodiment of the present invention provides a new technique for accurately detecting a document having a desired attribute.

Figure 2:
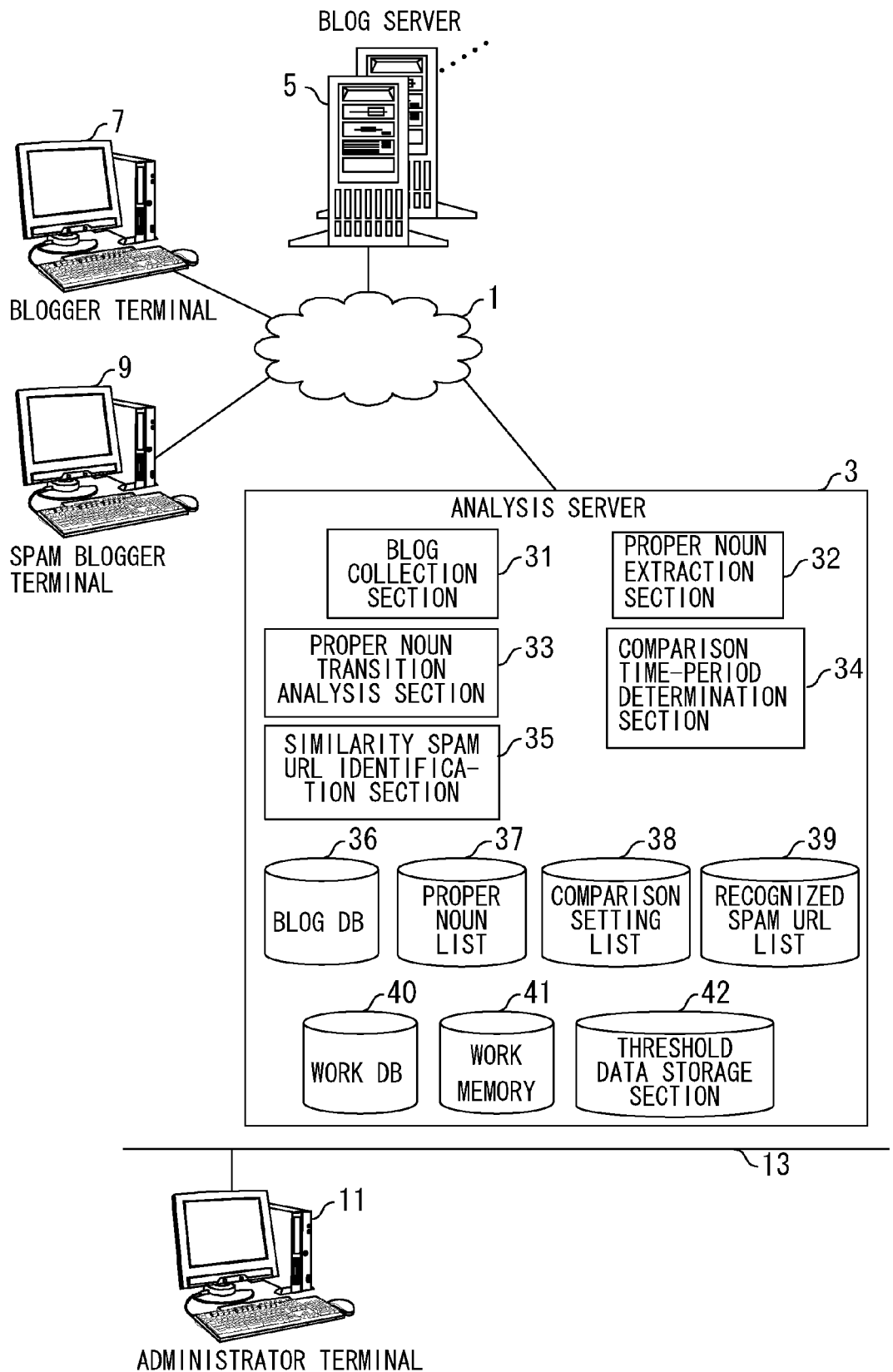
FIG. 2 depicts a system according to an example of an embodiment of the present invention.

FIG. 2 depicts a system. In FIG. 2, a network 1 constructed from the Internet or the like is connected to: a plurality of blog servers 5 for distributing blog articles; a plurality of blogger terminals 7 for generating ordinary blog articles and then registering the articles into the blog servers 5; a plurality of spam blogger terminals 9 for generating spam blog articles and then registering the articles into the blog servers 5; and an analysis server 3. Further, the analysis server 3 is connected to a LAN (Local Area Network) 13 of a company or the like that uses the analysis server 3. The LAN 13 is connected to an administrator terminal 11 operated by an administrator.

Here, registering blog articles into the blog servers 5 from the blogger terminals 7, generating spam blog articles and then registering the spam blog articles into the blog servers 5 by using the spam blogger terminals 9, and distributing the data of blog articles from the blog servers 5 are known. Thus, further description is omitted here.

Further, the analysis server 3 includes: a blog collection section 31 for collecting blog articles; a proper noun extraction section 32 for extracting proper nouns (alternatively, verbs, adjectives, and the like depending on the case) from the blog articles; a proper noun transition analysis section 33 for analyzing transition of appearance situations of proper nouns; a comparison time-period determination section 34 for determining the time period for comparing an analysis target with spam blogs recognized as spam; a similarity spam URL identification section 35 for identifying similarity spam URLs; an archival DB, e.g., a blog DB, 36 for accumulating the blog articles collected by the blog collection section 31; a work DB 40 for storing results obtained when the proper noun extraction section 32 processes the blog articles accumulated in the blog DB 36; a proper noun list 37 for storing results obtained when the proper noun transition analysis section 33 processes the data in the work DB 40 and the like; a comparison setting list 38 for storing results obtained when the comparison time-period determination section 34 processes the proper noun list 37 and the like; a recognized spam URL list 39 for storing results obtained when the similarity spam URL identification section 35 processes the comparison setting list 38 and the like; a work memory 41 for storing data under processing; and a threshold data storage section 42 for storing threshold data used in the processing.

Next, processing performed in the system shown in FIG. 2 is, e.g., described below with reference to FIGS. 3 to 19. First, the blog collection section 31 of the analysis server 3 collects blog articles from the plurality of blog servers 5, and then accumulates the blog articles into the blog DB 36 (step S1). URLs, article texts, and dates and times of registration into the blog servers 5 (or open dates and times) are registered at the time of this accumulation. Then, the proper noun extraction section 32 performs proper noun extraction processing of extracting proper nouns from the article texts of the blog articles accumulated in the blog DB 36, then aggregates the data periodically, e.g., on a unit time period of one month), and then registers URLs, corresponding unit time periods, and proper nouns into the work DB 40 (step S3). For example, data shown in FIG. 4 is registered into the work DB 40.

In the example shown in FIG. 4, a URL, a time period (that is, a corresponding unit time period), and a proper noun group are stored for each combination of a URL and a time period. In this example, the unit time period is a month. However, the unit time period may be a week, a day, etc.

Figure 3:
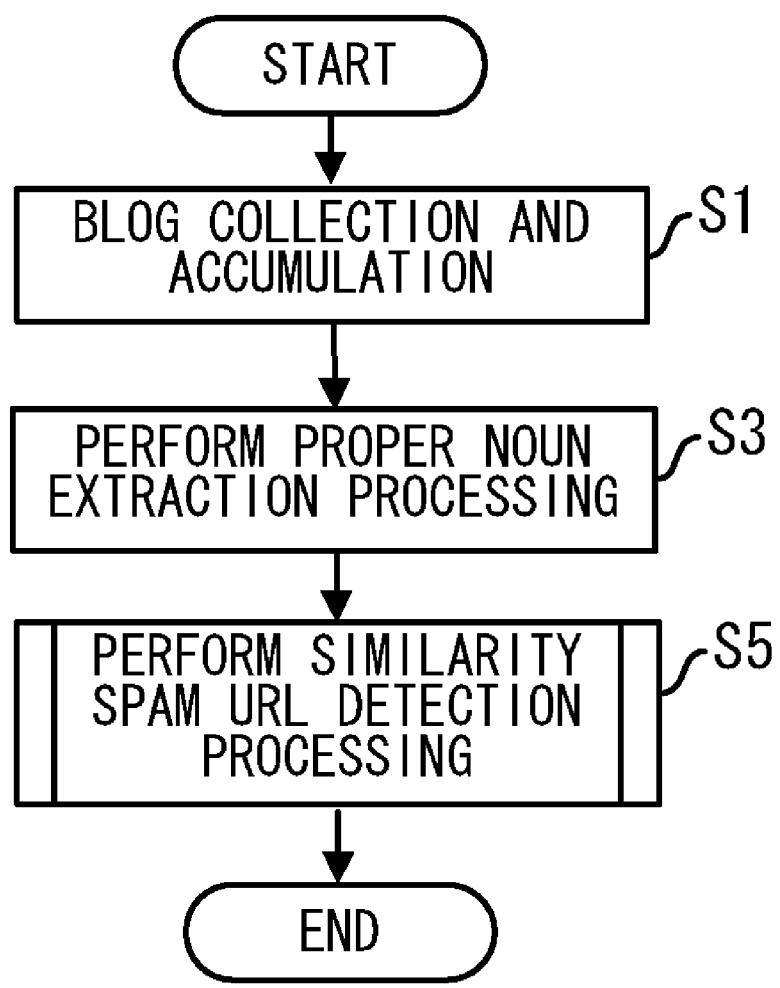
FIG. 3 depicts a method according to an example of an embodiment of the present invention.
Figure 5:
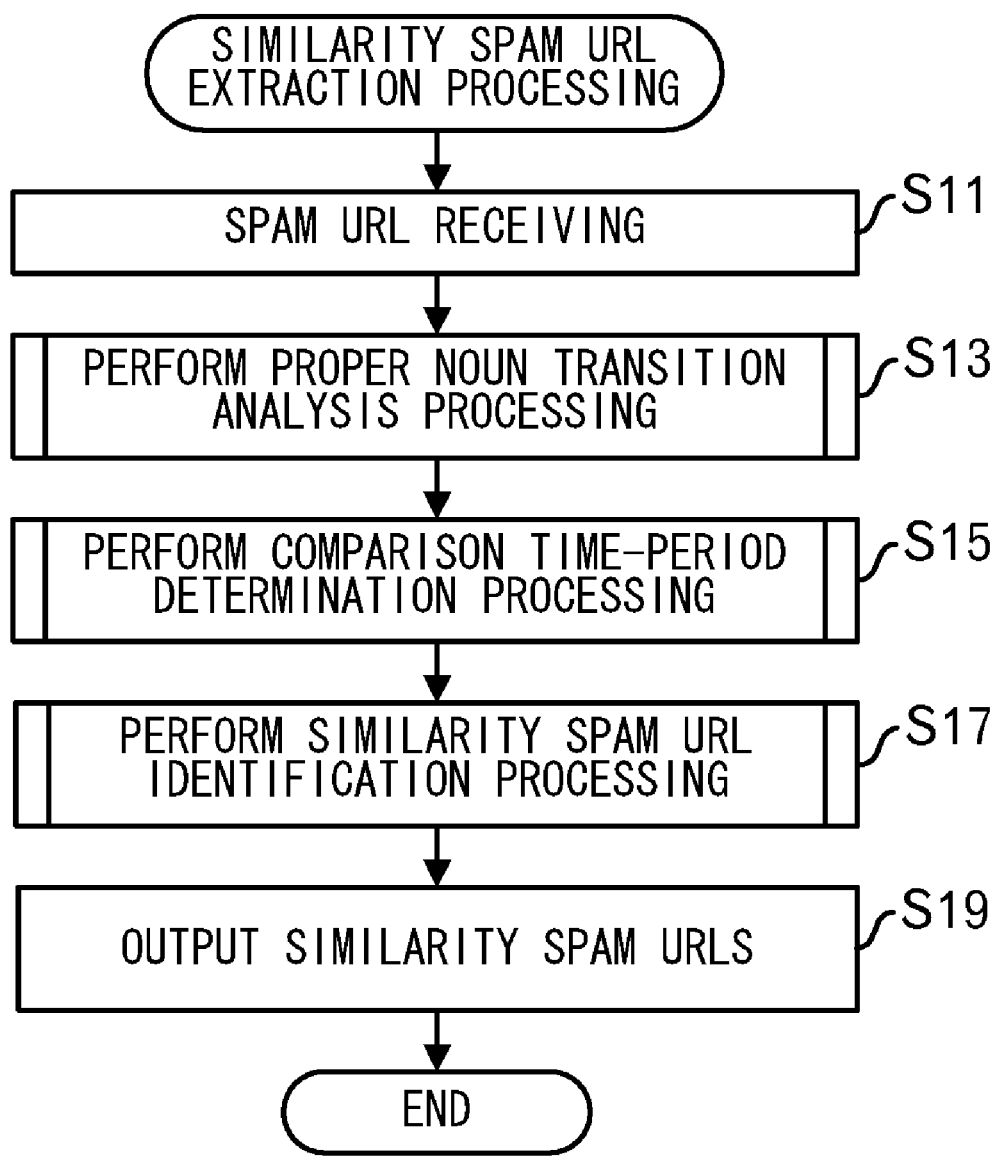
FIG. 5 depicts a method of similarity spam URL detection according to an example of an embodiment of the present invention.
Figure 6:
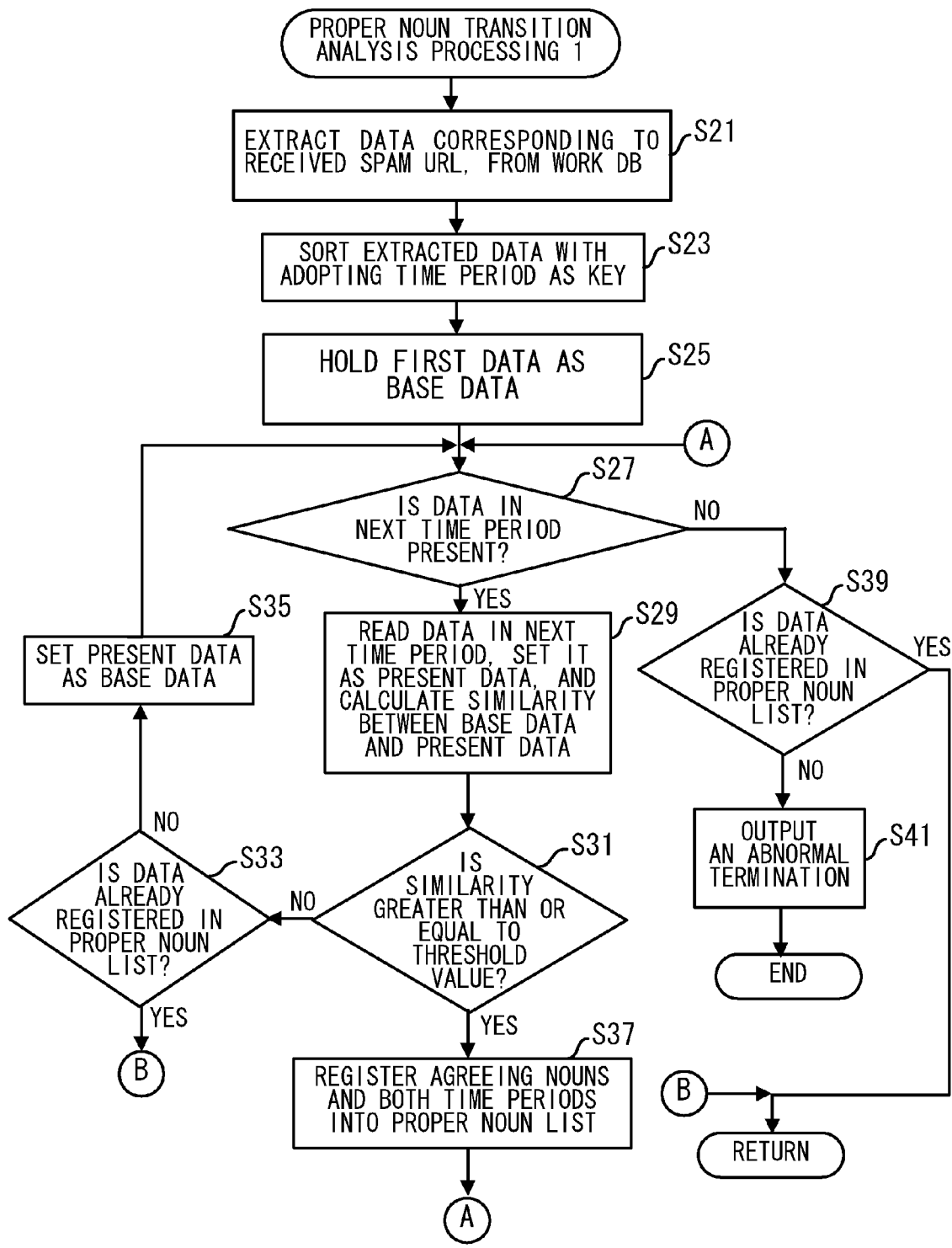
FIG. 6 depicts a method of proper noun transition analysis according to an example of an embodiment of the present invention.

Returning to the discussion of FIG. 3, after step S3, similarity spam URL detection processing is performed (step S5). This similarity spam URL detection processing is described below in detail with reference to FIGS. 5 to 19.

First, an administrator inputs into the administrator terminal 11 a URL of a blog already recognized as a spam blog, and then instructs the start of processing. The administrator terminal 11 receives the input of the spam URL, and then transmits to the analysis server 3 the processing start instruction containing the spam URL. The analysis server 3 receives from the administrator terminal 11 the processing start instruction containing the spam URL, and then stores the spam URL into the work memory 41 (step S11). Then, the analysis server 3 activates the proper noun transition analysis section 33. Thus, the proper noun transition analysis section 33 performs proper noun analysis processing (step S13). This processing is described later in detail. As described above, the processing result is stored into the proper noun list 37.

After that, the comparison time-period determination section 34 is activated. Thus, the comparison time-period determination section 34 performs comparison time-period determination processing by using the data in the proper noun list 37 (step S15). Details of this processing are also described later. As described above, the processing result is stored into the comparison setting list 38.

Then, the similarity spam URL identification section 35 is activated. Thus, the similarity spam URL identification section 35 performs similarity spam URL identification processing by using the data in the comparison setting list 38 (step S17). Details of this processing are also described later. As described above, the processing result is stored into the recognized spam URL list 39. The similarity spam URL identification section 35 transmits to the administrator terminal 11 a list of URLs in which the spam URL received from the administrator terminal 11 is removed from the URLs stored in the recognized spam URL list 39 (step S19). The administrator terminal 11 displays on a display device the list of URLs received from the analysis server 3.

By virtue of this, the administrator can identify the URLs of the blogs recognized as spam blogs. Further, when the analysis server 3 performs marketing data extraction processing with omitting the blogs registered in the recognized spam URL list, accurate data can be acquired. Variable kinds of marketing data extraction processing may be performed. However, this is not an essential point of the present invention, and hence further description is omitted here.

Figure 7:
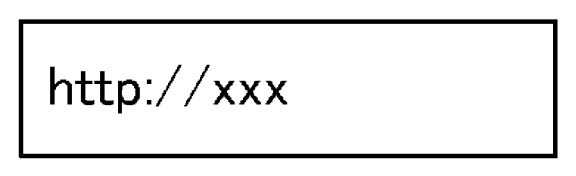

Next, proper noun transition analysis processing (step S13) is described below with reference to FIGS. 6 to 10. First, the proper noun transition analysis section 33 reads a received spam URL from the work memory 41, and then extracts from the work DB 40 the data corresponding to the received spam URL (step S21). For example, when the received spam URL is http://xxx as shown in FIG. 7, records in which http://xxx is registered as a URL are read from the work DB 40 shown in FIG. 4. For example, data shown in FIG. 8 is extracted. That is, records having corresponding unit time periods of August 2007, September 2007, October 2007, and November 2007 are extracted and then stored, for example, into the work memory 41.

Then, the proper noun transition analysis section 33 sorts the extracted data with adopting the corresponding unit time period as a key, and then stores the result into the work memory 41 (step S23). In the example shown in FIG. 8, sorting is already completed. Then, the first data (a record in the first row) is held as base data (step S25). Further, it is judged whether data in the next time period is stored in the work memory 41 (step S27). In a case that the data in August 2007 is set as the base data, since data in September 2007 is present, the procedure goes to step S29.

When data in the next time period is present, the proper noun transition analysis section 33 reads the data in the next time period, then sets the data as the present data, and then calculates the similarity between the proper nouns of the base data and the present data (step S29). For example, when the proper nouns in August 2007 and the proper nouns in September 2007 are compared with each other, the number of agreeing proper nouns is determined to be 0. Thus, the calculated similarity is 0.

Then, the proper noun transition analysis section 33 reads a similarity threshold value from the threshold data storage section 42, and then judges whether the calculated similarity is greater than or equal to the similarity threshold value (step S31). The threshold data storage section 42 stores data, for example, shown in FIG. 9. That is, the threshold data storage section 42 stores a similarity threshold value and a number-of-time-periods threshold value. Here, the number-of-time-periods threshold value is not yet determined. In the example described above, the similarity in August 2007 is 0. Thus, when the similarity threshold value is 3, the similarity is determined to be smaller than the threshold value.

When the similarity is smaller than the similarity threshold value, the proper noun transition analysis section 33 judges whether data is already registered in the proper noun list 37 (step S33). When data is already registered, this indicates that data in successive two or more unit time periods is already registered in the proper noun list 37. Thus, such data in successive two or more unit time periods is adopted as data serving as a comparison source. Accordingly, the procedure returns to the original processing via the point B. According to such a proper noun transition analysis, a time period composed of successive two or more unit time periods is identified.

On the other hand, when data is not registered in the proper noun list 37, the proper noun transition analysis section 33 sets the present data as the base data (step S35). In the example described above, in place of the data in August 2007, the data in September 2007 is set as the base data. Then, the procedure returns to step S27.

When the data in September 2007 is set as the base data, the data in October 2007 is set as the present data. Thus, when the proper nouns in September 2007 and the proper nouns in October 2007 are compared with each other, a similarity of 3 is obtained as shown in FIG. 8. This similarity is greater than or equal to the similarity threshold value of 3.

At step S31, when it is determined that the similarity is greater than or equal to the similarity threshold value, the proper noun transition analysis section 33 registers the agreeing nouns and the two time periods into the proper noun list 37 (step S37). In the example described above, September 2007, October 2007, and the agreeing proper nouns (B, D, and E) are registered into the proper noun list 37. Then, the processing returns to step S27 via the point A.

In the example described above, when the data in November 2007 is set as the present data and then the proper noun transition analysis section 33 calculates the similarity between the proper nouns in September 2007 and the proper nouns in November 2007, a similarity of "4" is obtained. Thus, the procedure goes to step S37, and then November 2007 and the proper nouns (A and C) are registered. Here, since duplicated registration is not performed, September 2007 and the proper nouns (B, D, and E) are not registered at this stage. When this step is completed, the entire data shown in FIG. 8 has been processed. At this stage, data shown in FIG. 10 is registered in the proper noun list 37.

Thus, at step S27, when it is determined that data in the next time period is not present, the proper noun transition analysis section 33 judges whether data is already registered in the proper noun list 37 (step S39). When data is already registered in the proper noun list 37, the procedure returns to the original processing.

On the other hand, when data is not registered in the proper noun list 37, the proper noun transition analysis section 33 transmits an abnormal termination to the administrator terminal 11 (step S41). Then, the subsequent processing is not performed.

Thus far, the discussion has been described for a case that abnormal termination is performed. However, for example, the first data in the result of sorting at step S23 may be registered into the proper noun list 37, and then the subsequent processing may be performed. Further, in the original subsequent processing, extracting the first month and the last month is to be performed. Thus, the unit time period may be changed, and hence the first day or week and the last day or week may be selected. Then, proper nouns corresponding to this change may be registered into the proper noun list 37. Alternatively, without abnormal termination, the unit time period may be changed, and then the above-mentioned processing may be performed newly.

Figure 11:
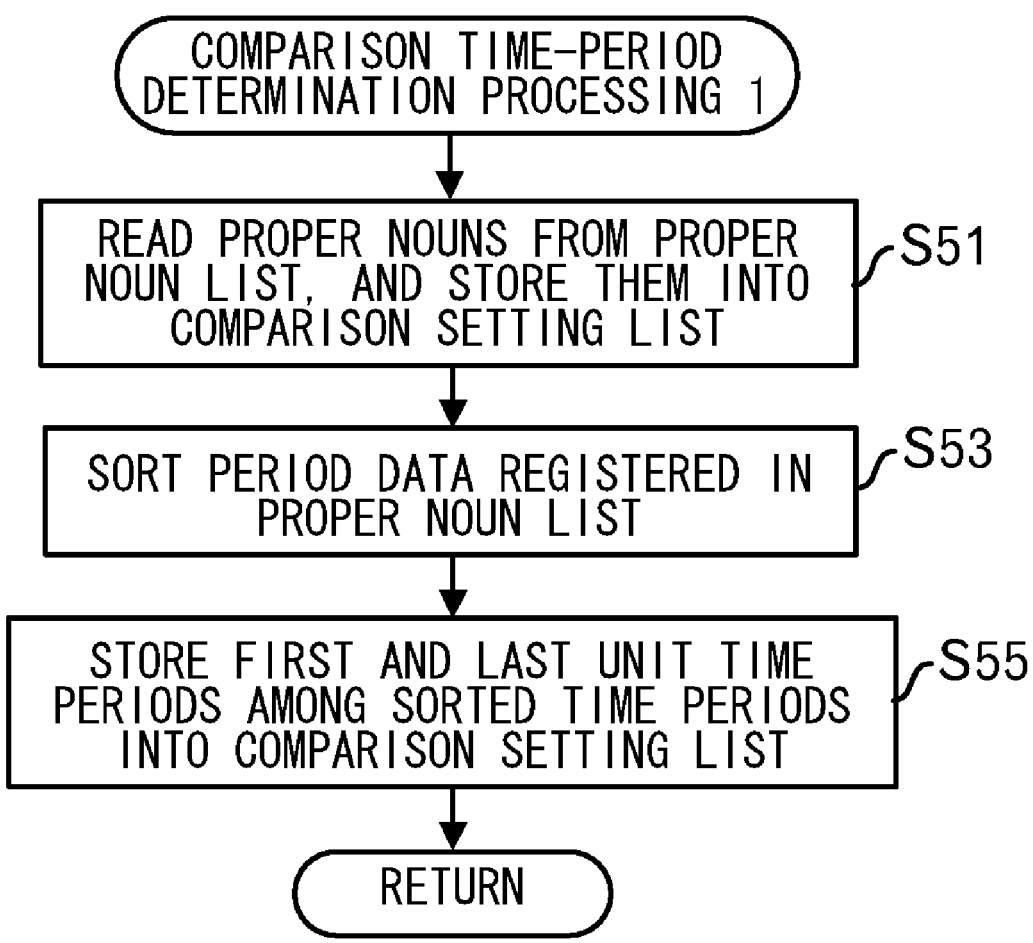
FIG. 11 depicts a method of comparison time-period determination processing according to a first embodiment of the present invention.

Next, the comparison time-period determination processing is described below with reference to FIGS. 11 and 12. First, the comparison time-period determination section 34 reads proper nouns from the proper noun list 37, and then registers the proper nouns into the comparison setting list 38 (step S51). Further, the comparison time-period determination section 34 sorts the time periods registered into the proper noun list 37 (step S53). Although the data is already sorted and arranged in order as a result of the processing in FIG. 6, this sorting is performed for ensuring. In the example shown in FIG. 10, the data is arranged in order of September 2007, October 2007, and November 2007. Then, the first and the last unit time periods in the sorted time periods are registered into the comparison setting list 38 (step S55). In the example described above, September 2007 and November 2007 are registered. Thus, for example, data shown in FIG. 12 is registered into the comparison setting list 38.

As such, in the comparison time-period determination processing, the first unit time period and the last unit time period are selected, and then comparison is performed in the successive processing. By virtue of this, the amount of calculation is reduced in comparison with a case that the comparison is performed on the entire time periods.

In the foregoing discussion, automatically extracting time periods for comparison has been performed. However, for example, an administrator may specify a particular time period as a time period for comparison by using the administrator terminal 11.

Next, the similarity spam URL identification processing is described below with reference to FIGS. 13 to 19. First, the similarity spam URL identification section 35 reads the comparison setting list 38 (step S61). Then, the similarity spam URL identification section 35 sets into the threshold data storage section 42 a number-of-time-periods threshold value corresponding to the number of time periods in the comparison setting list 38 (step S63). For example, when two time periods (September 2007 and November 2007) are stored in the comparison setting list 38 as shown in FIG. 12, the number-of-time-periods threshold value is set to be "2" as shown in FIG. 14. Here, in place of directly setting the number of time periods into the number-of-time-periods threshold value, a somewhat adjusted value may be adopted (for example, the origin value may be multiplied by an adjustment factor).

Further, the similarity spam URL identification section 35 extracts, from the work DB 40, data that agrees with any one of the evaluation target time periods in the comparison setting list 38 and that contains any one of the proper nouns. Then, the similarity spam URL identification section 35 stores the result into an extraction list in the work memory 41 (step S65). For example, a URL, September 2007, and a corresponding proper noun among records that contain any one of September 2007 and proper nouns A to E are stored into the work memory 41. Similarly, a URL, November 2007, and a corresponding proper noun among records that contain any one of November 2007 and proper nouns A to E are stored into the work memory 41. As a result, data shown in FIG. 15 is stored in the extraction list in the work memory 41. Here, at this step, the received spam URL (http://xxx in the example described above) may be removed from the processing target. Then, the similarity spam URL identification section 35 counts the number of records that have the same URL and the same time period in the extraction list in the work memory 41, and then registers the URL, the time period, and the number of counts into the similarity list in the work memory 41 (step S67). For example, five records are present that have a combination of http://xxx and September 2007. Further, three records are present that have a combination of http://yyy and September 2007. As a result of counting in this way, a similarity list shown in FIG. 16 is generated. That is, URLs, time periods, and the numbers of counts are stored.

After that, the similarity spam URL identification section 35 extracts records in which the number of counts is greater than or equal to the similarity threshold value from the similarity list, and then registers the result into the similarity URL list in the work memory 41 (step S69). The similarity threshold value is as shown in FIG. 14, and is "3" in this example. Thus, in the similarity list shown in FIG. 16, the fifth row alone has a value smaller than the threshold value, and hence is not registered into the similarity URL list. The similarity URL list stores, for example, data shown in FIG. 17. In the example shown in FIG. 17, URLs and time periods alone are registered.

Figure 18:
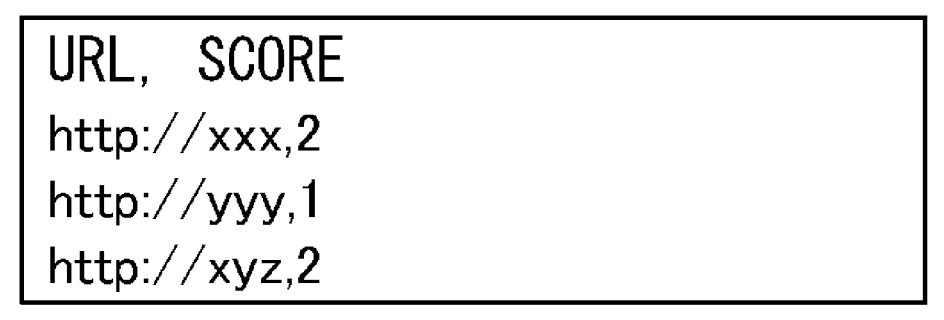

Then, the similarity spam URL identification section 35 counts the number of records that have the same URL in the similarity URL list, and then registers the result into a score list in the work memory 41 (step S71). In the case of the similarity URL list shown in FIG. 17, when counting is performed for each of http://xxx, http://yyy, and http://xyz, the score list shown in FIG. 18 is obtained. That is, the score is 2 for http://xxx and http://xyz, while the score is 1 for http://yyy. This indicates that in http://yyy, an article using the same proper nouns is present in September 2007 by chance, but that the proper nouns used are different in November 2007. That is, this blog is an ordinary one that uses presently popular proper nouns merely by chance.

Figure 19:
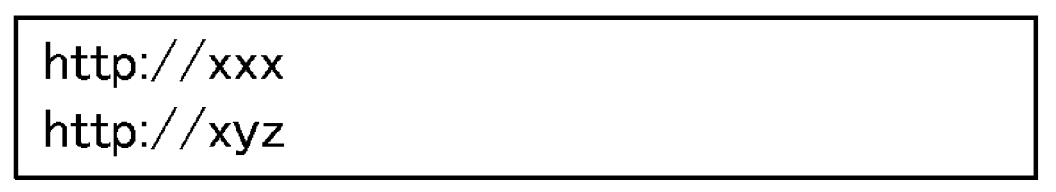

Finally, the similarity spam URL identification section 35 extracts URLs having a score greater than or equal to the number-of-time-periods threshold value from the score list in the work memory 41, and then registers the result into the recognized spam list 39 (step S73). As determined at step S63, the number-of-time-periods threshold value is "2". Thus, as shown in FIG. 19, http://xxx and http://xyz are registered into the recognized spam list 39. Here, http://xxx is a spam URL specified by the administrator. Thus, http://xyz alone is a newly recognized spam URL.

As described above, a single set of successive two or more unit time periods in which the appearance of proper nouns is similar to some extent is extracted as a comparison target time period for an inputted spam URL. Then, for the purpose of reduction in the amount of calculation, the similarity is calculated for the first unit time period and the last unit time period in the comparison target time period, so that it is checked whether the state of similarly high similarity is maintained during the comparison target time period. This avoids that a blog having a high similarity by chance is extracted as a spam blog. And still, a spam blog that uses proper nouns similar to those in an inputted spam URL during the comparison target time period can be identified.

When known, the comparison target time period may be specified by the administrator as described above. In this case, proper nouns used in the comparison target time period may simply be extracted for the inputted spam URL, and then registered into the comparison setting list 38. Alternatively, proper nouns used in one unit time period (e.g., a middle unit time period in the comparison target time period) contained in the comparison target time period may be extracted and registered into the comparison target list 38. Further, proper nouns common to the individual unit time periods contained in the comparison target time period may be extracted and registered into the comparison target list 38.

As described above, in the proper noun transition analysis processing, a single comparison target time period has been identified. By contrast, in the proper noun transition analysis processing, as many comparison target time periods as appearing are identified on the basis of similarity.

In the following discussion, the system outline discussed below is the same as that of FIG. 2. However, the proper noun transition analysis processing and the comparison time-period determination processing are different from those discussed above. These processing procedures are described below with reference to FIGS. 20 to 27. Then, finally, the manner that the comparison setting list generated in the comparison time-period determination processing is processed in the similarity spam URL identification processing (FIG. 13) is described with reference to FIGS. 28 to 33.

A proper noun transition analysis will be described below with reference to FIGS. 20 to 25. First, the proper noun transition analysis section 33 extracts from the work DB 40 the data of a received spam URL, and then stores the data into the work memory 41 (step S81). Then, the proper noun transition analysis section 33 sorts the extracted data with respect to the time period, and then registers the result into the input URL extraction list in the work memory 41 (step S83). For example, when data shown in FIG. 4 is stored in the work DB 40, the input URL extraction list has data shown in FIG. 21. Then, the proper noun transition analysis section 33 reads the first record from the input URL extraction list, then sets the record as the base data, and then stacks contained proper nouns (step S85). For example, at this stage, the base data becomes the same as the first row in the input URL extraction list as shown in FIG. 22(a). Further, proper nouns H to M are stacked.

Then, the proper noun transition analysis section 33 judges whether a record in the next time period is present in the input URL extraction list (step S87). In the example described above, August 2007 is the base data. Thus, a record in the next time period September 2007 is present. When a record in the next time period is present in the input URL extraction list, the data in the next time period is read from the input URL extraction list and then set as the present data. Further, the similarity is calculated between the proper nouns in the present data and the proper nouns in the base data (step S89). In the example described above, no proper noun is common between the proper nouns in August 2007 and the proper nouns in September 2007. Thus, the similarity is 0. Here, it is judged whether the calculated similarity is greater than or equal to the similarity threshold value stored in the threshold data storage section 42 (step S91). For example, in the threshold data storage section 42, a similarity threshold value of "3" and a number-of-time-periods threshold value of null (no setting) are set up as shown in FIG. 23. Thus, in the example described above, it is judged as being smaller than the similarity threshold value.

When the calculated similarity is smaller than the similarity threshold value, the proper noun transition analysis section 33 registers into the proper noun list 37 the time period of the base data, the time period of the preceding data, and the proper nouns in the stack (step S93). In the example described above, August 2007, August 2007, and proper nouns H to M are registered into the proper noun list 37. At this stage, data shown in FIG. 24 is registered in the proper noun list 37. Here, as the proper nouns in the stack are popped up, the stack becomes empty at step S93. Then, the present data is set as the base data (step S95), and then the proper nouns in the present data are stacked (step S97). Here, proper nouns A to E are stacked. After that, the procedure returns to step S87. At step S95, the base data is in a state shown in FIG. 22(b).

The procedure returns to step S87. Since a record in October 2007 which is the time period next to September 2007 is present, the procedure goes to step S89. Then, the record in October 2007 is set as the present data, and then the similarity is calculated between the base data and the present data. When FIG. 22(b) is compared with the third row in FIG. 21, three proper nouns are in agreement. Thus, the similarity is "3". As described above, the similarity threshold value is 3. Thus, it is determined that the calculated similarity is greater than or equal to the similarity threshold value.

At step S91, when it is determined that the calculated similarity is greater than or equal to the similarity threshold value, the proper noun transition analysis section 33 stacks the proper nouns in the present data (step S97). However, duplicated proper nouns are not stacked. In the example described above, at this stage, proper nouns F and G are stacked. Then, the procedure returns to step S87.

The procedure returns to step S87. Since a record in November 2007 which is the time period next to October 2007 is present, the procedure goes to step S89. Then, the record in November 2007 is set as the present data, and then the similarity is calculated between the base data and the present data. When FIG. 22(b) is compared with the fourth row in FIG. 21, fourth proper nouns are in agreement. Thus, the similarity is "4". As described above, the similarity threshold value is 3. Thus, it is determined that the calculated similarity is greater than or equal to the similarity threshold value. After that, the proper nouns in the present data are to be stacked. However, all the proper nouns in the present data are already stacked. Thus, the procedure goes to step S87. When the procedure returns to step S87, it is found that a record in the time period next to November 2007 is not present.

At step S87, when it is determined that a record in the next time period is not present in the input URL extraction list, the proper noun transition analysis section 33 registers the time period of the base data, the time period of the last data, and the proper nouns in the stack into the proper noun list 37 (step S99). Then, the procedure returns to the original processing.

As a result of this processing, data shown in FIG. 25 is registered into the proper noun list 37.

That is, as described above, for the spam URL specified by the administrator, all time periods that have a similarity greater than or equal to the threshold value can be extracted and then registered together with the related proper nouns into the proper noun list 37.

Figure 26:
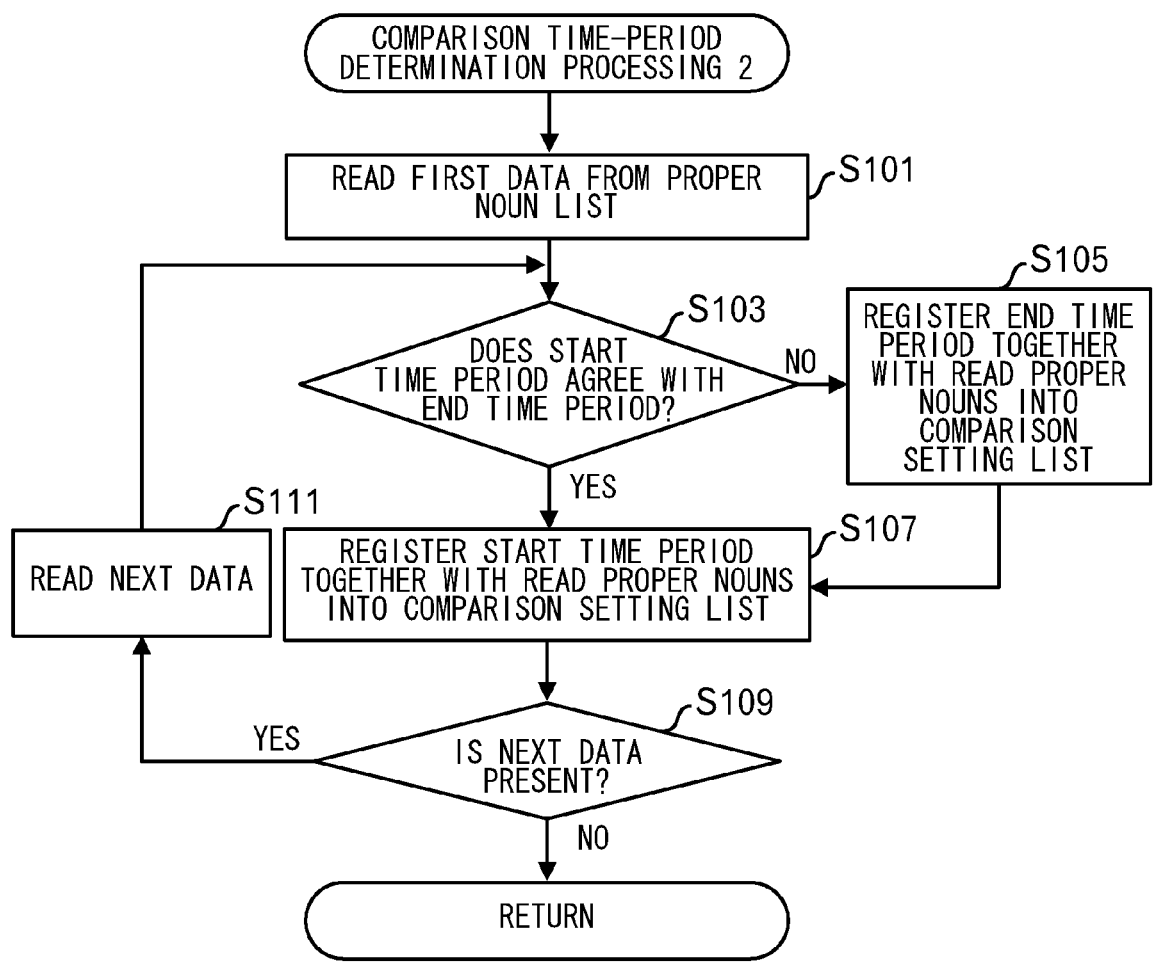
FIG. 26 depicts a method of comparison time-period determination processing according to an example of an embodiment of the present invention.

Next, the comparison time-period determination processing according to the second embodiment is described below with reference to FIGS. 26 and 27. The comparison time-period determination section 34 reads the first data from the proper noun list 37 (step S101), and then judges whether the start time period agrees with the end time period (step S103). In the example shown in FIG. 25, the start time period agrees with the end time period in the record in August 2007.

When the start time period agrees with the end time period, the comparison time-period determination section 34 registers the start time period together with the read-out proper nouns into the comparison setting list 38 (step S107), and then judges whether the next data is present in the proper noun list 37 (step S109). When the next data is present, the next data is read from the proper noun list 37 (step S111). Then, the procedure returns to step S103. In the example shown in FIG. 25, the next data is present, and hence the next data is read out.

Then, it is judged whether in the next data, the start time period agrees with the end time period. As a result, September 2007 disagrees with November 2007.

At step S103, when it is determined that the start time period disagrees with the end time period, the end time period and the read-out proper nouns are registered into the comparison setting list 38 (step S105). Then, the procedure goes to step S107.

As such, when the start time period disagrees with the end time period in the proper noun list 37, the data is divided into two records and then registered into the comparison setting list 38.

At this stage of processing, in the example described above, the data shown in FIG. 27 is registered in the comparison setting list 38. As such, the comparison target time period is identified as three unit time periods, while related proper nouns are listed for each unit time period.

The similarity spam URL identification processing that is performed next is almost the same as that in the first embodiment. However, the form and the number of records in the comparison setting list 38 shown in FIG. 27 are different from those in FIG. 12. Thus, somewhat different processing is performed.

Figure 13:
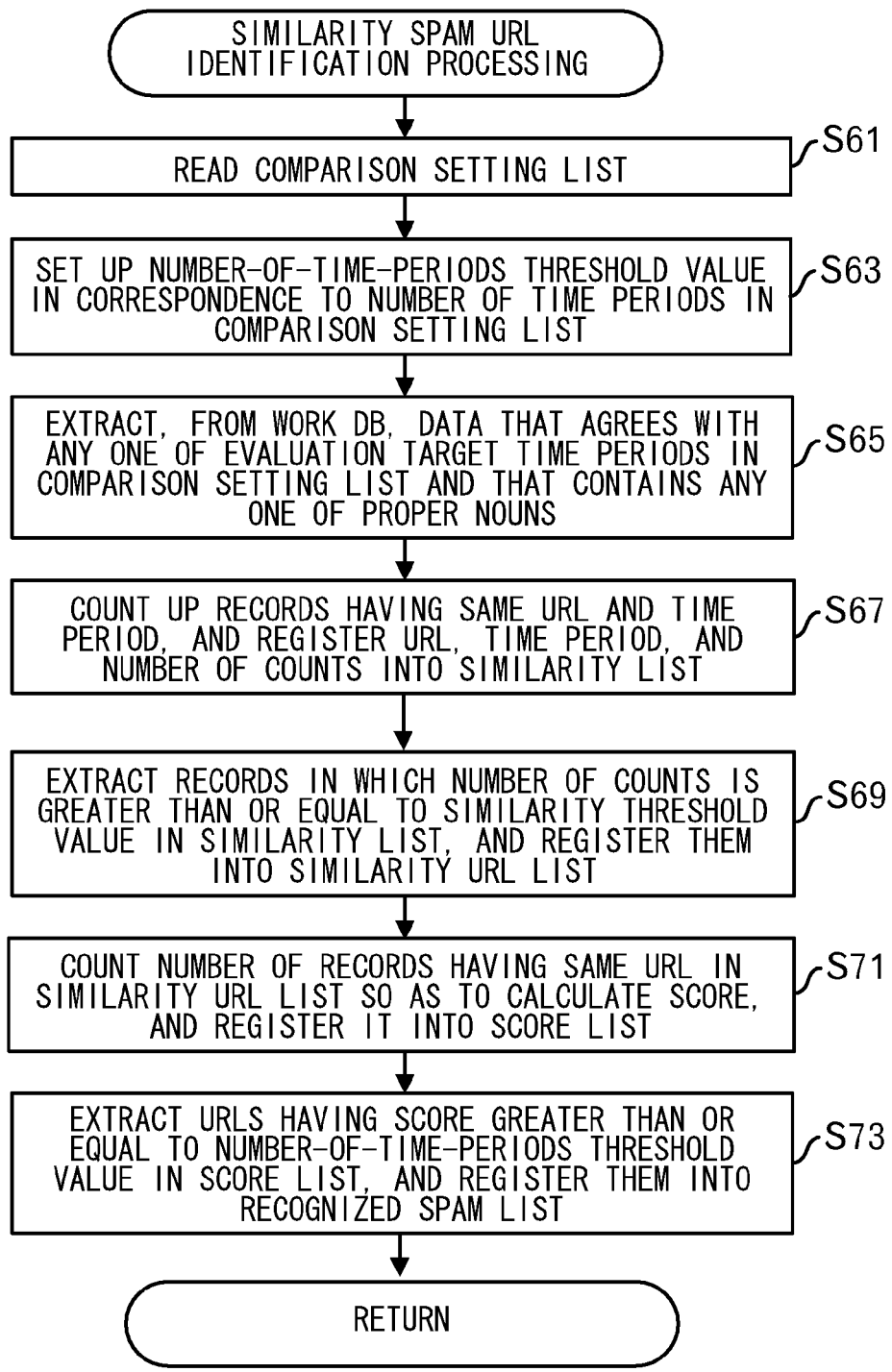
FIG. 13 depicts a method of similarity spam URL identification processing.
Figure 20:
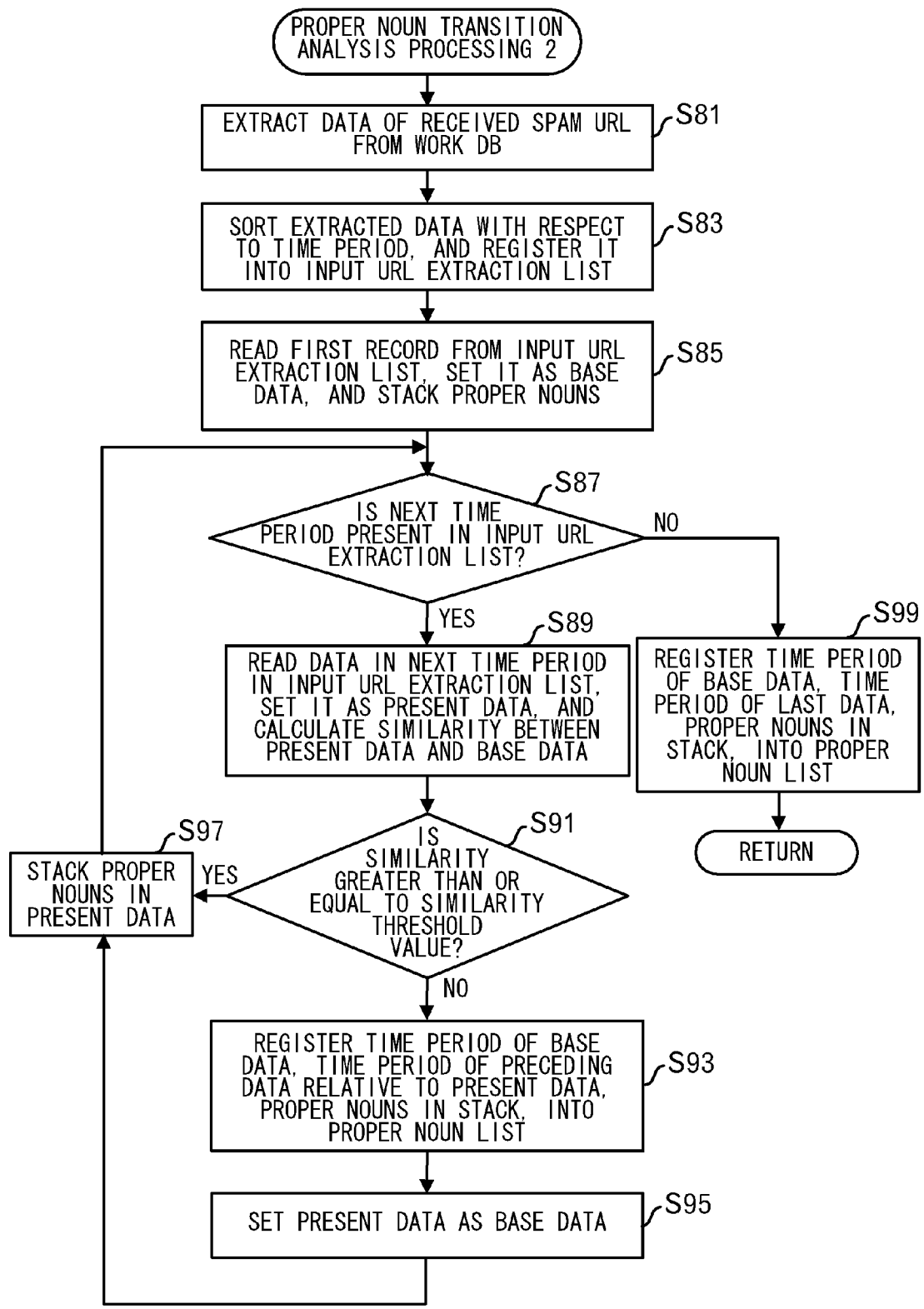
FIG. 20 is depicts a method of proper noun transition analysis processing according to an example of an embodiment of the present invention.

At step S63 in FIG. 13, the number of time periods is 3 as shown in FIG. 27. Thus, the number-of-time-periods threshold value is set to be "3" as shown in FIG. 28. At step S65, the data in August 2007 is also contained as shown in FIG. 27, the amount of extracted data increases. That is, the data shown in FIG. 29 is extracted from the work DB 40, and then registered into the extraction list in the work memory 41. Further, at step S67, the number of records is counted with respect to the combination of the URL and the time period, and then the data is registered into the similarity URL list in the work memory 41. At this time, the record corresponding to August 2007 is an increase. Specifically, the data shown in FIG. 30 is registered into the similarity list.

As shown in FIG. 28, the similarity threshold value is "3". Thus, at step S69, records that have a similarity greater than or equal to 3 in the similarity list shown in FIG. 30 are registered into the similarity URL list. Specifically, the similarity URL list shown in FIG. 31 is registered into the work memory 41. Then, at step S71, the number of records is counted for each URL, and then the score list shown in FIG. 32 is stored into the work memory 41. As shown in FIG. 28, the number-of-time-periods threshold value is "3". Thus, at step S73, the data shown in FIG. 33 is stored into the recognized spam URL list 39. As such, an effect similar to that in the first embodiment is obtained.

As many comparison target time periods as possible, in which the contents of spam URLs specified by the administrator are almost the same, are extracted, and then comparison is performed in both the first unit time period and the last unit time period, so that spam URLs can be identified with improved precision.

Figure 34:
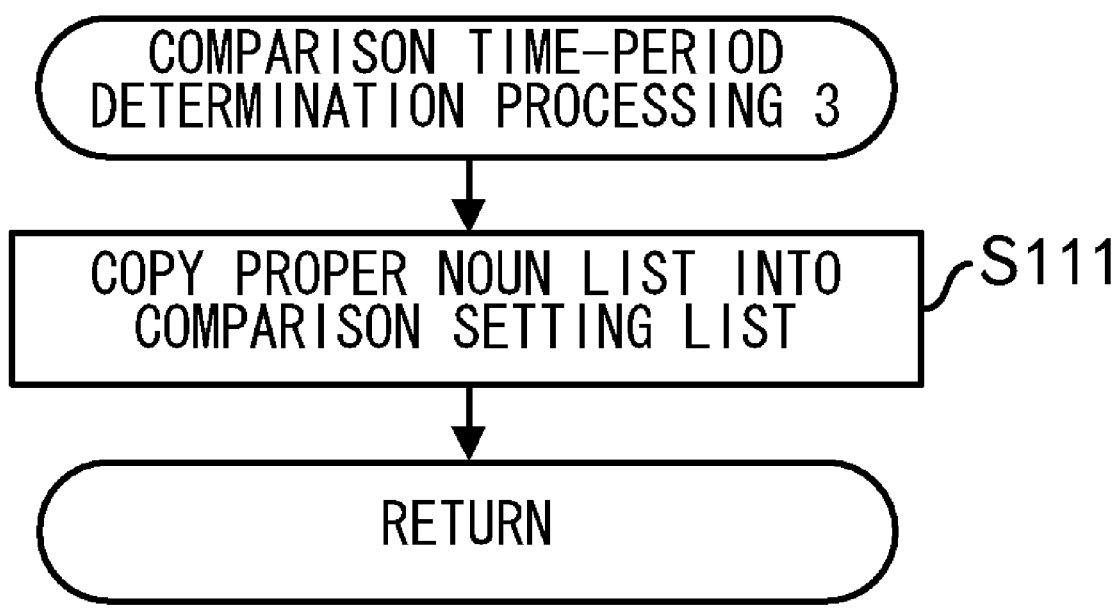
FIG. 34 is depicts a method of comparison time-period determination processing according to an example of an embodiment of the present invention.

In the comparison time-period determination processing discussed above, the first unit time period and the last unit time period have been identified from the time period in which the appearance situation of proper nouns is almost constant in spam URLs specified by the administrator. Alternatively, for example as depicted in FIG. 34, processing is performed in order to improve the detection accuracy for spam URLs.

Specifically, the comparison time-period determination section 34 copies the proper noun list 37 to the comparison setting list 38 (step S111). As a result, the data shown in FIG. 10 is set up in the comparison setting list 38. Then, in the similarity spam URL identification processing that is performed next, the similarity is judged for each of unit time periods of September 2007, October 2007, and November 2007. Then, when the similarity is not high in each unit time period, the data is not registered into the recognized spam URL list 39. Here, in place of the processing that the number of time periods in the comparison setting list 38 is adopted directly as the number-of-time-periods threshold value, the number-of-time-periods threshold value may be adjusted, for example, into the number of time periods×0.9 with taking into consideration a possible error.

Examples of embodiments of the present invention have been described above. However, the present invention is not limited to these. For example, the construction of the analysis server 3 shown in the functional block diagram in FIG. 2 need not necessarily correspond to an actual program module configuration. Further, the processing flows may be changed as long as the same processing result is obtained.

Further, in the description given above, the contents of the recognized spam URL list 39 has finally been transmitted to the administrator terminal 11. However, the contents need not be outputted, and may be used as an input for other processing in the analysis server 3.

Figure 35:
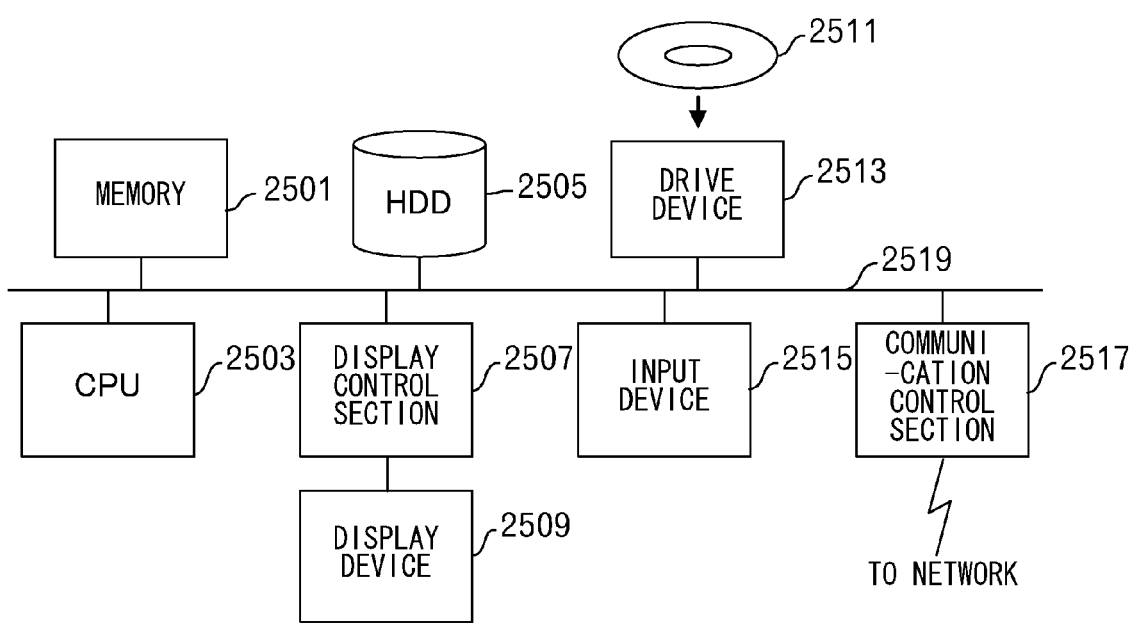
FIG. 35 depicts functional blocks of a computer according to an example of an embodiment of the present invention.

Here, the blogger terminal 7, the spam blogger terminal 9, the blog server 5, the analysis server 3, and the administrator terminal 11 described above have a configuration shown in FIG. 35. That is, a memory 2501 (a storage section), a CPU 2503 (a processing section) or a processor, a hard disk drive (HDD) 2505, a display control section 2507 (connected to a display device 2509), a drive device 2513 (for a removable disk 2511), an input device 2515, and a communication control section 2517 (for connecting to a network) are connected via a bus 2519. Application programs including an OS and a web browser are stored in the HDD 2505. When the programs are to be executed on the CPU 2503, the programs are read from the HDD 2505 into the memory 2501. Depending on the necessity, the CPU 2503 controls the display control section 2507, the communication control section 2517, and the drive device 2513 so as to perform necessary operation. Further, the data under processing is stored in the memory 2501 and, when necessary, stored in the HDD 2505. In such a computer, the above-mentioned hardware such as the CPU 2503 and the memory 2501, the OS, and the necessary application programs cooperate with each other so as to realize various functions described above.

At least one embodiment of the present invention may also be embodied as computer readable data including executable instructions that are recorded on a computer readable recording medium. The computer readable recording medium is any data storage device that can store the data, including the executable instructions, and which can be read by a computer system so as to provide the computer system with the executable instructions included in the recorded data for execution. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

The invention claimed is:

1. An attribute extraction method executable by a machine operatively connected to an archival memory and a work memory, the archival memory storing documents, registration dates thereof and attributes thereof, said method comprising:

extracting, vis-a-vis a plurality of documents in the archival memory that have registration dates falling within a desired time period, feature words for each attribute value of corresponding attributes of the plurality of documents;

registering, into said work memory, said desired time period, and said extracted feature words for said each attribute value of the corresponding attributes of the plurality of documents;

determining, amongst the extracted feature words in said work memory, first feature words for which an attribute has a first attribute value and second feature words for which said attribute has a second attribute value;

calculating a similarity between said first feature words and said second feature words;

identifying, a single unit time as said desired time period in case of absence of successive unit time periods in which a value of similarity between said first feature words is greater than or equal to a threshold value and adjacent unit time period in which a value of similarity between said first feature words is greater than or equal to the threshold value;

judging, based on the step of the identifying, whether the similarity satisfies a condition;

and outputting said second attribute value when said similarity satisfies the condition.

2. The attribute extraction processing method according to claim 1, further comprising: identifying, amongst the first feature words in the work memory, successive unit time periods in which a value of similarity between said feature words is greater than or equal to a threshold.

3. The attribute extraction processing method according to claim 1, wherein said desired time period includes a beginning unit time period and a last unit time period, and said determining includes: identifying, amongst the extracted feature words in said work memory, third feature words for which said attribute has the first attribute value and which correspond to said beginning unit time period, fourth feature words for which said attribute has the second attribute value and which correspond to said beginning unit time period; calculating a first value of similarity between said third feature words and said fourth feature words; identifying, amongst the extracted feature words in said work memory, fifth feature words for which said attribute has the first attribute value and which correspond to said last unit time period, and sixth feature words for which said attribute has the second attribute value and which correspond to said last unit time period; calculating a second value similarity between said fifth feature words and said sixth feature words; and judging whether the first value of similarity and the second value of similarity are greater than or equal to a threshold value, respectively.

4. The attribute extraction processing method according to claim 1, wherein said judging includes: identifying, amongst the extracted feature words in from work contents storage section, seventh feature words for which said attribute has the first attribute value and which correspond to a first one of desired time periods and, eighth feature words for which said attribute has the second attribute value and which correspond to the first one of said desired time periods; calculating a third value of similarity between said seventh feature words and said eighth feature words; identifying, amongst the extracted feature words in said work memory, ninth feature words for which said attribute has the first attribute value and which correspond to a second one of said desired time periods, and tenth feature words for which said attribute has the second attribute value and which correspond to the second one of said desired time periods; calculating a fourth value similarity between said ninth feature words and said tenth feature words; and judging whether the third value of similarity and the fourth value of similarity are greater than or equal to a threshold value, respectively.

5. The attribute extraction processing method according to claim 1, wherein said judging includes: identifying, amongst the extracted feature words in said work memory, eleventh feature words for which said attribute has the first attribute value and which correspond to a first interval within a first one of desired time periods, and twelfth feature words for which said attribute has the second attribute value and which correspond to said first interval; calculating a fifth value of similarity between said eleventh feature words and said twelfth feature words; identifying, amongst the extracted feature words in said work memory, thirteenth feature words for which said attribute has the first attribute value and which correspond to a second time interval within a second one of said desired time periods, and fourteenth feature words for which said attribute has the second attribute value and which correspond to said second interval; calculating a sixth value of similarity between said thirteenth feature words and said fourteenth feature words; and judging whether the fifth value of similarity and the sixth value of similarity are greater than or equal to a threshold value, respectively.

6. A computer-readable recording medium comprising computer-executable instructions for performing a method, execution of which by a computer facilitates attribute extraction by a computer operatively connected to an archival memory and a work memory, the archival memory storing documents, registration dates thereof and attributes thereof, said method comprising:

extracting, vis-a-vis a plurality of documents in the archival memory that have registration dates falling within a desired time period, feature words for each attribute value of corresponding attributes of the plurality of documents;

registering into said work memory said desired time period, and said extracted feature words for said each attribute value of the corresponding attributes of the plurality of documents;

determining, amongst the extracted feature words in said work memory, first feature words for which an attribute has a first attribute value and second feature words for which said attribute has a second attribute value;

calculating a similarity between said first feature words and said second feature words;

identifying, a single unit time as said desired time period in case of absence of successive unit time periods in which a value of similarity between said first feature words is greater than or equal to a threshold value and adjacent unit time period in which a value of similarity between said first feature words is greater than or equal to the threshold value;

judging, based on the step of the identifying, whether the similarity satisfies a condition;

and outputting said second attribute value when said similarity satisfies the condition.

7. An attribute extraction processing apparatus comprising:

an archival memory to store documents, registration dates thereof and attributes thereof; a work memory;

a processor to do at least the following:

extract, vis-a-vis a plurality of documents in the archival memory that have registration dates falling within a desired time period, feature words for each attribute value of corresponding attributes of the plurality of documents;

register into said work memory said desired time period, and said extracted feature words for said each attribute value of the corresponding attributes of the plurality of documents;

determine, amongst the extracted feature words in said work memory, first feature words for which an attribute has a first attribute and value second feature words for which said attribute has a second attribute value;

calculate a similarity between said first feature words and said second feature words;

identify, a single unit time as said desired time period in case of absence of successive unit time periods in which a value of similarity between said first feature words is greater than or equal to a threshold value and adjacent unit time period in which a value of similarity between said first feature words is greater than or equal to the threshold value;

judging, based on the step of the identifying, whether the similarity satisfies a condition;

and output said second attribute value when said similarity satisfies the condition.

* * * * *